March 14, 1939. E. H. GREIBACH Re. 21,030
BONE CONDUCTION HEARING DEVICE
Original Filed Nov. 11, 1933 2 Sheets-Sheet 1
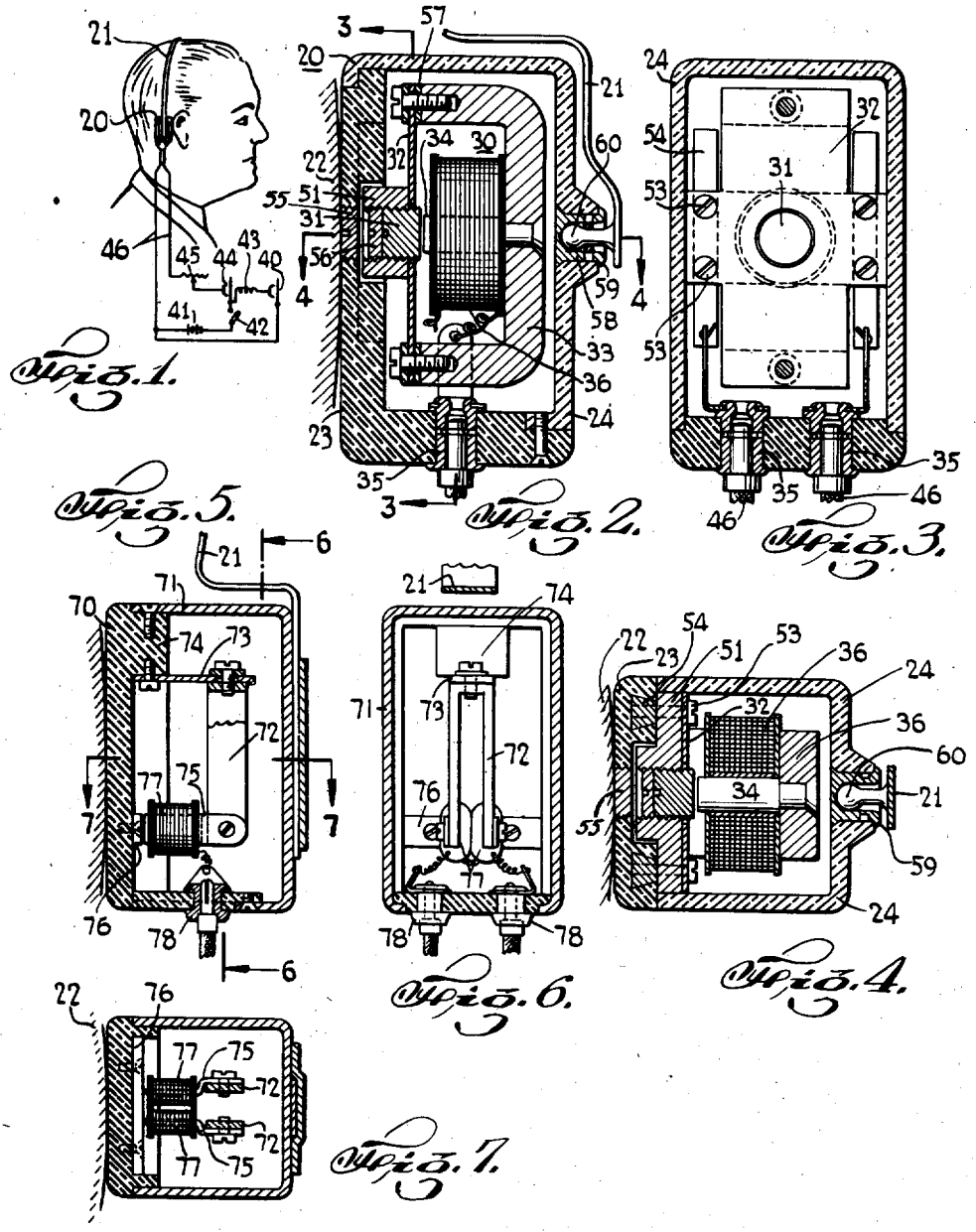
INVENTOR
EMIL HENRY GREIBACH
BY Richard A. Marsen
ATTORNEY

BONE CONDUCTION HEARING DEVICE

Original Filed Nov. 11, 1933 2 Sheets-Sheet 2

INVENTOR
EMIL HENRY GREIBACH
BY Richard Q. Marsen
ATTORNEY

Reissued Mar. 14, 1939

Re. 21,030

UNITED STATES PATENT OFFICE 21,030

BONE CONDUCTION HEARING DEVICE

Emil H. Greibach, Brooklyn, N. Y.

Original No. 2,127,468, dated August 16, 1938, Serial No. 697,673, November 11, 1933. Reissue No. 20,896, dated October 25, 1938, Serial No. 228,191, September 2, 1938. This application for reissue December 23, 1938, Serial No. 247,492

61 Claims. (Cl. 179—107)

This invention relates to bone-conduction hearing devices and it has particular relation to bone conduction receivers for hearing aids or audiphones.

Among the objects of the invention is a bone conduction receiver suitable for wearable hearing aids that is small enough for inconspicous wear in contact with hearing-inducing bones of the user and is powerful enough for imparting to the bones the vibratory energy required for conducting the sound vibrations over the bones of the head to the hearing nerves of the inner ear and induce hearing.

Figure 8:
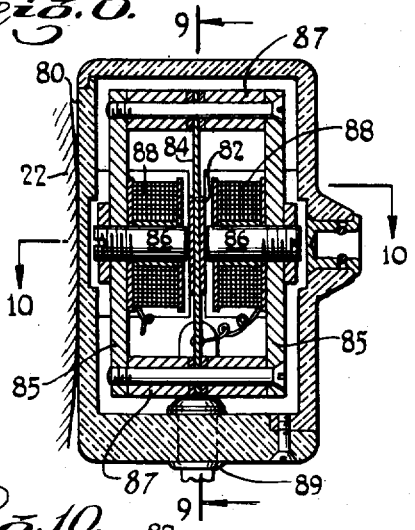
Figure 9:
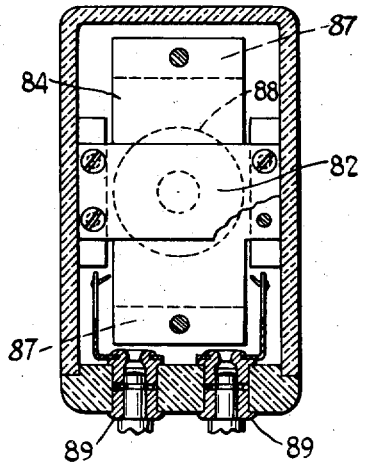
Figure 10:
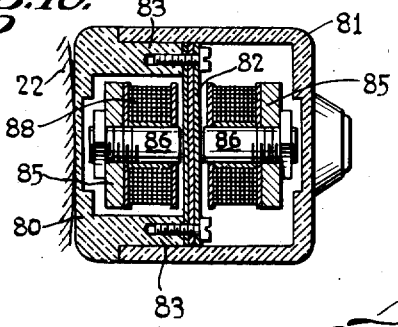
Figure 12:
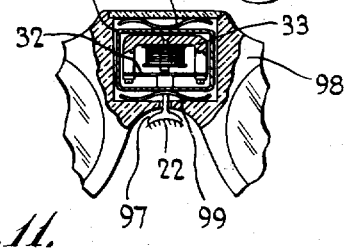
Figure 11:
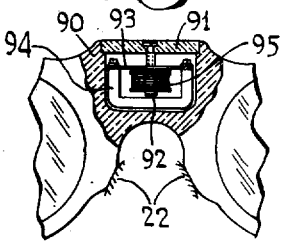

The foregoing and other objects of the invention will be best understood from the following description of the exemplifications thereof illustrated in the accompanying drawings in which Fig. 1 is a diagrammatic view of a wearable bone conduction hearing aid showing a bone conduction receiver of the invention worn on the head of a deafened person;

Fig. 2 is an enlarged sectional view of a bone conduction receiver exemplifying the invention;

Figs. 3 and 4 are vertical and horizontal sectional views, respectively, along lines 3—3 and 4—4 of Fig. 2;

Fig. 5 is an enlarged sectional view of another bone conduction receiver exemplifying the invention;

Figs. 6 and 7 are vertical sectional views, respectively, along lines 6—6 and 7—7 of Fig. 5;

Fig. 8 is an enlarged sectional view of another bone conduction receiver exemplifying the invention;

Figs. 9 and 10 are vertical and horizontal sectional views, respectively along lines 9—9 and 10—10 of Fig. 8;

Figs. 11 and 12 are sectional views of other types of bone conduction receivers exemplifying the invention.

It has long been known that the majority of the deafened persons have impaired middle ears and can hear much better sound vibrations conducted through the bones of the head to the inner ear than sound transmitted through the air in the ear canal. However, prior to the present invention, only telephone hearing aids which transmitted sound through air in the ear canal and the middle ear have been available as hearing aids for the deafened. All prior efforts to make a bone conduction hearing aid device followed the principles underlying the telephone receivers and utilized an externally supported heavy stationary driving mass of a vibratory structure for vibrating a driven vibratory member usually in the form of a projecting button or rod for imparting to the bones the large-intensity small-amplitude vibrations required for inducing hearing by bone conduction. As a result all prior operative bone conduction hearing devices had to be large, heavy and cumbersome.

The invention overcomes these difficulties by utilizing the principle of preservation of the center of gravity of a moving mass system for producing large-intensity small-amplitude vibrations required for inducing hearing by bone-conduction with a light, small vibratory structure which may be comfortably and inconspicuously worn coupled to a bone of the hearing inducing bone body of the user, such as on the mastoid bone of the head behind the ear.

In accordance with the invention, a relatively small vibratory mass portion is resiliently carried on a hearing inducing bone of the massive body of the head of the user to form therewith a vibratory system; and this vibratory system is subjected to internal forces induced by electric speech currents so as to accelerate the resiliently carried vibratory portion relative to the much larger mass of the head in the inverse ratio of their masses and thereby produce inertia reaction forces acting on the bone, proportional to the acceleration and the mass of the resiliently carried vibratory portion, for imparting to the bone the vibratory energy required for conducting corresponding vibrations of relatively large intensity and small amplitude through the bones to the inner ear and inducing intelligible hearing of speech by bone conduction.

In the practical embodiment of the invention, the resiliently carried vibratory driving mass portion is mounted on a substantially rigid bone-coupling vibratory contact wall portion and so combined therewith into a vibratory unit that when it is placed by an external force against the bone, the vibratory unit automatically assumes a stable-equilibrium coupling position along the bone so that a relatively small external force is sufficient to maintain the vibratory unit and its resiliently carried vibratory driving mass portion in efficient vibration transmitting coupling engagement with the bone, and no precautions are required to prevent the vibratory unit from tipping or otherwise breaking its efficient coupling engagement with the bone.

The stable-equilibrium coupling arrangement of the hearing inducing vibratory unit also assures highly efficient transmission of the vibratory energy to the bones because the inertia reaction forces exerted by the accelerations of the resiliently carried vibratory driving mass portion are arranged to act in a general direction substantially perpendicular to the predominant direction of the contact wall and the engaged bone surface, and also because the contact wall renders firmer the skin layer portion separating the bone from the contact wall, thereby reducing the compliance of the skin layer and improving its vibration transmitting properties, as well as the coupling between the mass of the head and the resiliently carried vibratory driving mass portion.

The above-described arrangement of the bone conduction hearing device of the invention utilizes the large mass of the head as the instrumentality for bringing about the acceleration of the small resiliently carried vibratory driving mass portion relative to the head body in the inverse ratio of their masses, and thereby translating the electric speech frequency oscillations into the relatively large-intensity vibrations of small amplitude which are imparted to the bone for inducing intelligible hearing of speech by bone conduction. As a result, intelligible hearing by bone conduction is made possible with a light and inconspicuously small vibratory unit, formed essentially of the small vibratory driving mass portion and its vibratory bone-coupling contact wall portion by means of which it is resiliently carried on the bone of the head, and having only a small fraction of the mass and volume of the body of head.

Such small bone conduction hearing device of the invention may be designed to have a very favorable response characteristic over a wide frequency range, reaching out above the resonance frequency. Its response may be extended down to low frequencies so as to give it a good response over the speech as well as the musical range by making its resonant frequency considerably lower than the resonance frequency of the telephone-type devices. By a small amount of damping the response may be made substantially uniform over the speech and musical frequency range.

The low resonance frequency may be secured with a relatively large effective stiffness of the resilient spring junction on which the driving vibratory mass portion is carried by building up the relatively small driving mass of all suitable mass elements of the vibratory structure.

The arrangement of the bone conduction receiver described above makes it also possible to shape the bone-coupled driven vibratory contact wall portion so that it forms a protective casing in the interior of which the driving vibratory mass portion is resiliently carried in a freely vibrating condition in which it cannot be disturbed by external forces. As a result, the bone conduction receiver of the invention may be made in the form of a light small casing unit arranged so that when it is placed by an external force against the bone, its exterior contact surface automatically assumes a stable-equilibrium coupling position along the bone in which it secures efficient transmission of the vibratory hearing inducing energy produced by the resiliently carried interior vibratory driving mass portion, which is thus protected against disturbance by external forces.

A wearable bone conduction hearing aid equipped with a bone conduction receiver exemplifying the principles of the invention is shown in Figs. 1 to 4. It comprises a bone conduction receiver shaped in the form of a small vibrating casing 20 which is held pressed against hearing inducing bones of the user outside the ear canal, for instance, the mastoid bone 22, by a resilient head band 21, of steel, for instance.

The casing 20 consists of a rigid base 23 and a rigid cover 24 suitably secured to the base and engaged by the head band 21 so as to press the casing 20 against the bones 22.

The receiver casing 20 is a part of a vibratory structure formed of an electromagnetic vibrating unit 30 comprising a magnetic armature core 31 clamped to the base 23 and carrying on a resilient magnetic armature diaphragm 32 a vibratory magnetic core 33 having a central pole piece 34 forming with the adjacent face of the armature a small magnetic gap. The vibratory structure is actuated with electric audiofrequency current oscillations supplied through terminal bushings 35 provided in a terminal block extending from the base 23 to the actuating windings of coil 36 mounted on the pole piece 34 so as to produce a vibratory motion between the mass of the resiliently carried vibratory core 33 and the armature core 31 which is held against the head and forms a part of the casing 20.

Since the mass of the head is relatively large, it resists the vibratory motion of the casing, and the smaller resiliently carried vibratory core 33 is subjected to vibratory accelerations. As a result, the resiliently carried vibratory core 33 acts as a driving member and exerts on the armature core 31 and the casing 20 which is coupled to the hard bones of the head inertia reaction forces proportional to the resiliently carried driving vibratory mass and the acceleration imparted to it by the electric current oscillation in the windings of the coil 36. Since the casing 20 and armature 31 which is clamped to it are in engagement with the bones, these inertia reaction forces drive the casing against the hard bones and impress on the bones relatively large oscillatory inertia reaction forces of small amplitude which are conveyed through the bones to the hearing nerves where they induce hearing corresponding to the audiofrequency oscillations impressed on the vibratory structure.

Although the principles underlying the bone conduction receiver using an electromagnetic vibrating structure shown in Figs. 2 to 4, lends itself for the construction of bone conduction receivers actuated by other types of vibrating structures, electromagnetic vibrating structures are particularly suitable for use in such bone conduction receivers because they permit the design of highly efficient vibrating structures with very small magnetic operating gaps of less than one thousandth of an inch. Such design assures extremely efficient operation of electro-magnetic bone conduction receivers, and makes possible the construction of bone conduction receivers of extremely small size and relatively large power output required for satisfactory wearable bone conduction hearing aids.

Inertia reaction bone conduction receivers of the invention constructed with electromagnetic vibrating structures have also the further advantage that they may be used as a part of a standard wearable hearing aid worn hidden in the clothing of the user, by substituting the bone conduction receiver for the air conduction receiver without having to resort to special transformers or other accessories required when such bone conduction receivers are constructed with other types of vibrating structures.

In Fig. 1 is shown how the electro-magnetic inertia reaction bone conduction receiver of the invention is connected in the operating circuit of a prior-art wearable hearing aid. A conventionally illustrated microphone transmitter 40 is connected in series with a supply battery 41 and a cut-off switch 42 to the actuating coil 43 of a conventionally illustrated amplifier microphone 44 which is connected in series with the battery 41 and the cut-off switch 42 by way of a rheostat 45 to the leads 46 which have terminal plugs engaging the terminal bushings 35 on receiver casing and lead to the actuating winding 36 of the receiver.

With such wearable hearing aid assembly, sound waves of the principal audible frequency range, or the frequency range of intelligible speech, impinging on the microphone transmitter 40 will produce in the primary circuit including the amplifier winding 43 corresponding electric audiofrequency oscillations and actuate the amplifier microphone 44 to produce corresponding amplified oscillations which are delivered to the energizing coil 36 of the bone conduction receiver which is held pressed against the bones and transmits through the bones corresponding inertia reaction hearing inducing vibratory forces to the inner ear of the user, or his auditory center.

The actual size of the bone conduction receiver shown in Figs. 2 to 4 is only about one-third the size in which it is shown in the original drawings. Its resiliently carried vibratory core 33 is formed of a U-shaped permanent magnet and its central core piece 34 is formed of soft iron and secured as by riveting to the center of the core 33. The permanent magnet 33 is magnetized so that its outer arms are of one polarity and its center portion to which the core piece 34 is joined of opposite polarity.

The end surfaces of the two outer core arms of the vibratory core 33 have their outer surfaces on the same level as the pole face of the central core 34, their surfaces being preferably ground to the same level. The armature diaphragm 32 is made of a magnetically conducting spring steel and has its center portion stiffened by integrally uniting it, as by soldering or brazing, to a heavy rigid anchoring cross bar 51 of iron, for instance, extending transversely across the diaphragm 32.

The central portion of the armature diaphragm 32 extends over the full length of the cross bar 51 and is integrally united thereto as by soldering or brazing. The center portion of the anchor bar 51 is provided with a threaded hole 218 in which is threadedly mounted the armature core 31 having at its exterior end a slot for turning it to adjust the distance of its pole face from the pole face of the core piece 34.

The end portions of the cross bar 51 are undercut and fit the side walls of a groove provided in the base 23 of the receiver, which may be molded of a synthetic resin. The cross bar 51 is tightly clamped to the base 23 by four screws 53 which are screwed into metal anchorers 54, imbedded within the base. An opening in the base 23 is enclosed by sealing plug 55 to give access to the groove of the armature 31 for adjusting the gap. Once the adjustment is made, the armature 31 may be locked in place, for instance, by a lock member 56. To the ends of the armature diaphragm 32 are united, as by soldering or brazing, reinforcing plates 57 so as to provide a solid clamping joint between the arms of the vibratory core 33 and the ends of the armature diaphragm 32.

However, the gap adjustment may be made before the armature supporting bar 51 is clamped to the base and the base may be made with a solid outer surface.

The head band 21 has a detachable universal joint connection with the cover 24. A socket 58 with a lock spring 59 arranged similar to a familiar snap fastener is embedded in the wall of the cover 24, and a shank 60 extending from the head band has a ball-shaped end which may be inserted into the socket to form with it a detachable universal joint connection. This universal joint connection assures that, when the head band 21 presses the receiver casing 20 against the bones, the contact surfaces of the receiver will automatically adjust itself to secure an efficient coupling engagement with the bones in a stable-equilibrium coupling position.

Instead of a head band, any other suitable arrangement for coupling the receiver structure to the bones may be used.

In manufacturing the bone conduction receiver of Figs. 2 to 4, the vibratory core 33 with the coil 36 and the armature diaphragm 31—32 with the cross bar 51 may be assembled as a self-contained unit and the gap between the armature 31 and the core piece 34 adjusted by turning the armature 31 until its pole face contacts with the core piece 34. Thereupon the armature 31 is turned back on its thread until a magnetic gap of the desired small length is provided between the adjacent pole surfaces and the armature 31 is locked in place. In this adjusted position the assembled vibrator structure may be tested and after final adjustment clamped to the base 23.

A practical bone conduction receiver constructed as shown in Figs. 3 to 4, with the following principal dimensions, will give satisfactory results: Permanent magnet core of a total outer length of 1''; a core thickness of 1/8''; a core height of about 1/4''; a core width of about 7/16''; a center core diameter of about .120''; and a diaphragm thickness of about .014''. The magnetic gap is of the order of one thousandth of an inch. The vibratory permanent magnet core and the center core of the dimensions given above, have a mass of about 8 grams. The foregoing data show that a satisfactory bone conduction receiver of the invention, suitable for inconspicuous wear by the user, may be constructed with a driving vibratory portion having an overall mass which is only a small fraction of the mass of the head.

Because of the relatively large mass of the head, the bone-coupled driven portion of the receiver will under the action of the vibratory forces induced by audio-frequency oscillations have only an imperceptible vibratory movement and will be practically stationary while the resiliently carried driving vibratory mass portion will be subjected to audio-frequency accelerations. As a result of this vibratory movement, relatively large reactive forces will be imparted by the mass of the resiliently carried vibratory driving core to the bones of the head, transmitting thereto vibrations of small amplitude and large force sufficient to convey by bone-conduction speech and music to the auditory center of the head. The magnetic gap is made very small, of the order of a mil or less, thereby securing a high negative stiffness. The armature diaphragm 32 is made of sufficient cross section to permit flow of a strong permanent flux through the gap and also to permit inducing strong alternating fluxes through the magnet gap by the action of the sound-frequency current oscillations passing through the actuating coil. The stiffness of the armature diaphragm is made large enough to overcome the negative stiffness of the magnetic flux and secure stable vibrations under the action of the fluctuating magnetic field in the gap.

By making the joint between the diaphragm 32 and the bar 51 by which it is held clamped to the base solid and firm, as by soldering, the center portion of the diaphragm strip does not participate in the vibratory movement of the lateral diaphragm portions, eliminating distortion that might occur otherwise. By providing at the ends of the diaphragm 32 reinforcing strips 57 which are integrally united with the diaphragm, disturbances due to non-uniform clamping of the diaphragm ends are prevented, eliminating distortion.

The high negative stiffness secured by the small magnetic gap enables the use of a relatively thick diaphragm 32 having sufficient cross section for carrying the flux while at the same time making its effective stiffness opposing the negative magnetic stiffness sufficiently small to operate with a resonance frequency at which good response is secured over a large sound-frequency range.

In the electromagnetic bone conduction receiver described in connection with Figs. 2 to 4, the relatively large resiliently carried vibratory mass of the receiver is utilized to produce the inertia reaction forces required for imparting hearing by bone conduction and a very stiff spring member is utilized to carry the driving vibratory mass so as to give a resonance frequency which assures a good response over the speech frequency range. The use of such stiff spring makes possible the operation of the electromagnetic vibrating structure with an extremely small magnetic gap distance at which the high flux densities and large magnetic forces in the gap do not produce fringing or freezing of the pole faces bordering the gap. Such small gaps are made possible by the utilization of the coupled vibratory portion of the vibrating structure as casing which protects the resiliently carried vibratory mass against any disturbance by external forces. This combination of elements assures an extremely efficient vibratory structure and makes possible the development of relatively large power in a very small receiver unit.

In the bone conduction hearing device described above, the large-intensity, small-amplitude forces required for inducing intelligible hearing of speech by bone conduction are produced with a small vibratory unit formed of a driven vibratory portion having a resilient junction carrying a driving vibratory mass portion that has only a small fraction of the mass of the head, and a contact wall sufficiently large and so arranged opposite the driving vibratory portion as to maintain the vibratory unit in a stable-equilibrium coupling position on the bone with a relatively small external force and couple by the resilient junction the small mass of the driving vibratory portion with the large mass of the head into a vibrating system having a resonance frequency which gives a good response in the speech frequency range and produces by electric speech frequency oscillations accelerations of the resiliently carried mass which impart to the bone the hearing inducing vibratory energy.

Such arrangement makes it possible to use only a small external coupling force for holding the vibratory unit in its most efficient hearing inducing coupling position, particularly since the inertia reaction forces which act in a general direction perpendicular to the contact wall assist in positioning the vibratory unit along the bone. As a result, no precautions are required to prevent tipping of the bone receiver unit and a comfortable head-band which is attached to the vibratory unit through a loose pivotal universal joint connection exerting the small external coupling force makes possible the automatic positioning of the vibratory unit in its most efficient, stable-equilibrium, vibration-transmitting coupling position along the bone, and this efficient coupling engagement is not upset or disturbed by irregularities of the external coupling force.

In Figs. 5 to 7 is shown a bone conduction receiver of the invention constructed with a cantilever-type vibratory structure for producing the inertia reaction forces required for inducing hearing by bone conduction. It comprises a vibratory casing, formed of a rigid base 70 and a cover 71, held pressed against hearing inducing bones 22 by a head band 21 engaging a channel member formed in the cover 71. The casing 70—71 is a part of a vibratory structure of the cantilever-type formed of a U-shaped permanent magnet core 72 resiliently carried by a spring 73 clamped to a block 74 extending from the base 70, and pole pieces 75 extending from the arms of the magnet core 72 to form magnetic gaps with a magnetic armature core 76 clamped to the base of the casing. A vibratory motion is produced between the resiliently carried vibratory magnet core 72 and the armature 76 with its casing 70—71 by actuating the vibratory structure with audio-frequency current oscillations supplied to actuating windings mounted on the pole pieces 75 through the terminal bushings 78 provided in a terminal block extending from the base 70.

Since the bone-coupled base 70 resists motion and the resiliently carried driving vibratory core 72 has a substantial mass relatively large inertia reaction forces will be exerted by the vibratory core 72 on the armature 76 and therethrough over the casing to the bones for inducing hearing by bone conduction.

In order to secure efficient operation of the vibratory structure with a very tiny gap of the order of one thousandth of an inch or less, the spring 73 has a longitudinal slot for permitting adjustment of the position of the resiliently carried vibratory magnet core 72 on the spring 73 so as to assure operation at a minimum gap distance between the pole faces of the pole pieces 75 and the armature 76 without causing fringing of the adjacent pole faces.

In Figs. 8–10 is shown a bone conduction receiver embodying a balanced magnetic vibratory structure for producing the inertia reaction hearing-inducing vibrations.

It comprises a vibratory casing formed of a base 80 and a cover 81 held pressed against hearing inducing bones 22 by a head band 21 having a universal joint connection with the cover 81, as in the bone receiver of Figs. 2 to 4. The casing 80—81 is a part of a vibratory structure formed of a magnetic armature core 82 having its opposite ends clamped to two base projections 83 and resiliently carrying on its magnetic diaphragm extensions 84 a vibratory balanced magnetic core system formed of magnetic core blocks 87 and core bars 85 having central core pole pieces 86 facing the opposite faces of the armature 82 to form therewith two magnetic gaps.

The magnetic system is magnetized so that the two pole pieces 86 are of opposite polarity and pass a permanent magnetic flux from one pole piece 86 across the armature 82 and its two gaps to the other pole piece 86, the path of the permanent flux being completed by the magnetic core blocks 87 through which the ends of the opposite magnet bars 85 are clamped to the reinforced ends of the diaphragm 84 without using the diaphragm extensions 84 for carrying the permanent flux.

On each pole piece 86 are mounted coils of actuating windings 88 which are supplied with electric audiofrequency oscillations through terminal bushings 89 mounted on a terminal block extending from the base 80. The two coils 88 are so connected that when actuated by audiofrequency current oscillations the flux in one magnetic gap is reduced while it is increased in the other gap, the diaphragm extensions 84 serving as return paths for the alternating flux. Since the armature 82 is rigidly clamped to the base 80, the audiofrequency flux variations in the two armature gaps will produce a vibratory motion between the resiliently carried vibratory core bars 85 and the armature 82 and the inertia reaction of the resiliently carried vibratory mass will exert on the armature 82, and therethrough, by way of the casing wall, on the bones of the user, inertia reaction forces which induce hearing by bone conduction.

To secure efficient operation of the magnetic vibrating structure, the core pole pieces 86 are threadedly mounted in holes of the magnet bars 85 so as to make possible adjustment of the gaps between the pole faces of the core pieces 86 and the gap faces of the armature 82 at which the gaps will be a minimum without causing fringing of the adjacent pole faces during the operation of the receiver. Lock nuts provided on the exterior threaded ends of the core pole pieces 86 permit locking of the pole pieces 86 in their adjusted positions.

By using a balanced magnetic system in the bone conduction receiver of the invention, of the type shown in Figs. 8 to 10, even harmonic distortion is eliminated and objectionable saturation of the flux paths is avoided.

Since the permanent flux acting on the opposite pole faces of the armature is balanced, the armature diaphragm is not subjected to any permanent deflection. Furthermore, the maximum amplitude of the vibrations between the armature and the vibratory core is limited by the small magnetic gaps of the order of one thousandth of an inch on the opposite sides of the armature.

Accordingly, flexing of the armature diaphragm beyond its elastic limit is prevented, and even if the receiver is dropped, and the momentum of the heavy vibratory mass tends to impart a large deflection to the armature diaphragm, this deflection will be limited by the small gaps on the opposite sides of the armature to a value at which the elasticity of the diaphragm will automatically restore the normal gap spacing.

As a result, the receiver may be dropped without damage, and it may be operated with smaller gaps than receivers without balanced magnetic core systems, thereby increasing its efficiency.

In Figs. 11 and 12 are shown two other exemplifications of an inertia reaction bone conduction receiver of the invention. In the arrangement of Fig. 11, a receiver housing formed of a casing 90 and a top wall 91 has clamped to the top wall 91 an extension of a magnetic core piece 92 on which is mounted a magnetic diaphragm 93 resiliently carrying a vibratory U-shaped magnet core 94 which has a central pole face forming a magnetic gap with the pole face of the core piece 92. The vibratory structure is actuated by a coil 95 mounted on the core piece 92 clamped to the top 91 of the casing to produce under the action of audiofrequency currents a vibratory motion between the resiliently carried vibratory core 94 and the core piece 92. As a result, the inertia reaction of the resiliently carried vibratory core exerts hearing inducing vibratory forces on the core piece 92 and therethrough, over the casing 90 on the hearing-inducing bones engaged by the casing.

The casing of the bone conduction receiver shown in Fig. 11, is illustrated in the form of a bridge member of a spectacle frame and its exterior walls are shown curved to form a concave contact surface for securing intimate coupling engagement with the bones 22 of the nose and secure an efficient transmission of the hearing-inducing vibratory energy from the receiver casing to the bones.

In the arrangement of Fig. 12 is shown an inertia reaction bone conduction receiver of the invention having an electromagnetic vibrating structure similar to that shown in Figs. 2 to 4. It comprises a vibratory magnetic core 33 resiliently carried by an armature diaphragm 32 which is clamped to a wall of an enclosing casing 96 having a projecting contact member 97 with a curved concave contact surface held in engagement with hearing inducing bones 22 of the user. This bone conduction receiver is likewise designed for mounting in a bridge member of a spectacle frame 98 forming a housing around the receiver casing 96 and supporting it between two springs 99 so as to prevent the vibrations of the receiver casing 96 which are transmitted by the contact member 97 to the bones of the nose from being transmitted to the spectacle frame 98.

The performance and the quality of the reproduction in the bone conduction receivers of the invention described above may be increased without increasing their weight and size by employing instead of ordinary steel diaphragms special materials of high magnetic permeability, such as Hypernik, A-metal or Permalloy. These materials have a much higher magnetic permeability than ordinarily used spring steel. They accordingly reduce the flux reluctance and enable development of larger fluxes increasing the power output of a given size and weight of structure.

In the bone conduction receivers described above, such high permeability materials may be used notwithstanding their relatively smaller elasticity, because the small amplitudes with which the diaphragms are required to operate produce only small strains in such diaphragms, and these strains are within their elasticity limits. By using such materials for diaphragms, they may be given a relatively great thickness without unduly increasing their stiffness, thus providing a large cross section of highly permeable magnetic material for producing a large flux and providing at the same time the required elasticity for operating with a desirable degree of stiffness.

The principles of the invention described above in connection with various types of electromagnetic vibrating structures will suggest to those skilled in the art many other ways of making small inertia reaction bone conduction receivers with various other types of electrically actuated vibratory structures which are generally used for constructing telephones, loudspeakers and similar acoustic devices. It is accordingly desired that the appended claims be given a broad construction commensurate with the scope of the invention within the art.

I claim:

1. In a bone conduction hearing aid device suitable for inconspicuous wear by a deafened person, an elastically deformable vibratory member having two vibratory portions and means for actuating said vibratory member with electric oscillations substantially throughout the speech frequency range for producing corresponding vibrations of said vibratory portions, one of said vibratory portions having a contact surface arranged to be held coupled under pressure to hearing inducing bones of the user and resiliently carrying the other of said vibratory portions, the resiliently carried vibratory portion having sufficient mass and exerting under the action of the elastic oscillations sufficient inertia reaction forces upon the coupled vibratory portion and therethrough upon the coupled bones of the user for imparting thereto the vibratory energy required for conducting corresponding vibrations through the bones to the inner ear of the user and induce intelligible hearing.

2. In a bone conduction hearing device suitable for inconspicuous wear by a user, a vibratory structure having a driving magnetic core member and a driven magnetic core member resiliently joined into a magnetic flux path including a gap, means for holding said driven core member coupled under pressure to hearing inducing bones of the user outside the ear canal and carrying said driving core member in a vibrating condition, and windings interlinked with said flux path for actuating said vibratory structure with electric oscillations of the principal audible frequency range to produce corresponding vibrations of said core members across said gap, said driving core member having a sufficiently large mass and exerting under the action of the electric oscillations sufficient inertia reaction forces upon said driven core member and therethrough upon the coupled bones for imparting thereto the vibratory energy required for conducting corresponding vibrations through the bones to the inner ear and induce intelligible hearing.

3. The method of enabling a deafened person to hear speech through bone conduction by imparting audio-frequency vibrations to a bone of the massive head body surrounding his inner ears which resides in so resiliently carrying in a vibratory condition and in a stable-equilibrium coupling position on the bone a vibratory portion having a mass that is smaller than about two hundred grams and only a small fraction of the mass of the head body but greater than about four grams that the large mass of the body and the small mass of the resiliently carried vibratory portion form a vibrating system having a resonance frequency which gives a good response in the speech frequency range, and accelerating the resiliently carried vibratory portion relative to the bone with electric oscillations of the principal speech frequency range so as to produce by the acceleration of the resiliently carried vibratory mass portion inertia reaction forces which impart to the bone the vibratory energy required for conducting corresponding vibrations of relatively large intensity and small amplitude through the bones to the inner ear and induce intelligible hearing of the speech.

4. The method of enabling a deafened person to hear speech through bone conduction by imparting audio-frequency vibrations to a bone of the massive head body surrounding his inner ears which resides in so resiliently carrying in a freely vibratory condition and in a stable-equilibrium coupling position on the bone a vibratory electromagnetically actuated portion having a mass that is smaller than about two hundred grams and only a small fraction of the mass of the head body but greater than about four grams that the large mass of the body and the small mass of the resiliently carried vibratory portion form a vibrating system having a resonance frequency which gives a good response in the speech frequency range, and accelerating the resiliently carried vibratory portion relative to the bone with electric oscillations of the principal speech frequency range so as to produce by the acceleration of the resiliently carried vibratory mass portion inertia reaction forces which impart to the bone the vibratory energy required for conducting corresponding vibrations of relatively large intensity and small amplitude through the bones to the inner ear and induce intelligible hearing of the speech.

5. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said vibratory unit having a wall portion with lateral dimensions of the order of the lateral dimensions of the driving vibratory portion or greater, sufficiently large and so arranged thereunder as to maintain said vibratory unit in a stable-equilibrium coupling position on the bone under a relatively small external force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the wall portion surface required for imparting to the driven vibratory portion and therethrough to the bone vibrations of large intensity and small amplitude required for inducing intelligible hearing of speech by bone conduction.

6. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently extended and so arranged thereunder as to maintain said vibratory unit in a stable-equilibrium coupling position on the bone under a relatively small external force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the wall portion surface required for imparting to the driven vibratory portion and therethrough to the bone the vibrations of large intensity and small amplitude required for inducing intelligible hearing of speech by bone conduction, said wall portion forming part of a casing enclosing said driving vibratory portion.

7. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said vibratory unit having a wall portion with lateral dimensions of the order of the lateral dimensions of the driving vibratory portion or greater, sufficiently large and so arranged thereunder as to maintain said vibratory unit in a stable-equilibrium coupling position on the bone under a relatively small external force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the wall portion surface required for imparting to the driven vibratory portion and therethrough to the bone vibrations of large intensity and small amplitude required for inducing intelligible hearing of speech by bone conduction, and external supporting means having a pivotal joint connection with said vibratory unit for holding said driven vibratory portion operatively coupled to the bone.

8. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about two hundred grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said vibratory unit having a substantially rigid wall portion sufficiently large and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts on the driven vibratory member and therethrough on the bone inertia reaction forces required for inducing intelligible hearing of speech by bone conduction.

9. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about two hundred grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said vibratory unit having a substantially rigid wall portion sufficiently large and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; said vibratory unit having a closure portion arranged to protectively isolate from the exterior the space across which said vibratory members vibrate; the mass of the driving vibratory member and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts on the driven vibratory member and therethrough on the bone inertia reaction forces required for inducing intelligible hearing of speech by bone conduction.

10. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about two hundred grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said vibratory unit having a substantially rigid wall portion sufficiently large and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction.

11. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about four grams, and smaller than about two hundred grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said vibratory unit having a substantially rigid wall portion sufficiently large and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction, and external supporting means having a pivotal joint connection with said vibratory unit for holding said wall portion cooperatively coupled to the bone.

12. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about two hundred grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said vibratory unit having a substantially rigid wall portion sufficiently large and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; said vibratory unit having a closure portion arranged to protectively isolate from the exterior the space across which said vibratory portions vibrate; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction.

13. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about one hundred and sixty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion sufficiently extended and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces required for imparting to the driven vibratory portion and therethrough to the bone vibrations of large intensity and small amplitude required for inducing intelligible hearing of speech by bone conduction.

14. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about four grams, and smaller than about one hundred and sixty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion sufficiently extended and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces required for imparting to the driven vibratory portion and therethrough to the bone vibrations of large intensity and small amplitude required for inducing intelligible hearing of speech by bone conduction, and external supporting means having a pivotal joint connection with said vibratory unit for holding said wall portion cooperatively coupled to the bone.

15. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about one hundred and sixty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion sufficiently extended and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibations of said vibratory portions across the space between said vibratory portions; said vibratory unit having a closure portion arranged to protectively isolate from the exterior the space across which said vibratory portions vibrate; the mass of the driving vibratory portion and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces required for imparting to the driven vibratory portion and therethrough to the bone vibrations of large intensity and small amplitude required for inducing intelligible hearing of speech by bone conduction.

16. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about one hundred and sixty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory member forming a part of a wall portion sufficiently extended and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts inertia reaction forces required for imparting to the driven vibratory member and therethrough to the bone vibrations of large intensity and small amplitude required for inducing intelligible hearing of speech by bone conduction.

17. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about one hundred and sixty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory member forming a part of a wall portion sufficiently extended and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing coresponding vibrations of said vibratory members across said gap; said vibratory unit having a closure portion arranged to protectively isolate from the exterior the space across which said vibratory members vibrate; the mass of the driving vibratory member and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts inertia reaction forces required for imparting to the driven vibratory member and therethrough to the bone vibrations of large intensity and small amplitude required for inducing intelligible hearing of speech by bone conduction.

18. In a wearable bone conduction hearing aid device, a vibratory structure designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about one hundred and twenty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction.

19. In a wearable bone conduction hearing aid device, a vibratory structure designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about one hundred and twenty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; said vibratory structure having a closure portion arranged to protectively isolate from the exterior the space across which said vibratory portions vibrate; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently lage and subjected by the oscillations to sufficient acceleration relative to the bone so that the driving vibratory portion exerts on the driven vibratory portion and therethrough on the bone inertia reaction forces required for inducing intelligible hearing of speech by bone conduction.

20. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about one hundred and twenty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory portion forming part of a substantially rigid wall portion with lateral dimensions of the order of the lateral dimensions of the driving vibratory portion or greater, sufficiently large and so arranged opposite thereto as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried diving vibratory member is sufficiently large and subjected by the oscillations to sufficient acceleration relative to the bone so that the driving vibratory member exerts inertia reaction forces required for imparting to the driven vibratory member and therethrough to the bone vibrations of large intensity and small amplitude required for inducing intelligible hearing of speech by bone conduction.

21. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about one hundred and twenty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory portion forming part of a substantially rigid wall portion with lateral dimensions of the order of the lateral dimensions of the driving vibratory portion or greater, sufficiently large and so arranged opposite thereto as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; said vibratory unit having a closure portion arranged to protectively isolate from the exterior the space across which said vibratory members vibrate; the mass of the driving vibratory member and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts inertia reaction forces required for imparting to the driven vibratory member and therethrough to the bone vibrations of large intensity and small amplitude required for inducing intelligible hearing of speech by bone conduction.

22. In a wearable bone conduction hearing aid device, a vibratory structure designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about one hundred grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction.

23. The method of enabling a deafened person to hear speech through bone conduction by imparting audio-frequency vibrations to a bone of the massive head body surrounding his inner ears which resides in so resiliently carrying in a vibratory condition and in a stable-equilibrium coupling position on the bone a vibratory portion having a mass that is smaller than about one hundred and twenty grams and only a small fraction of the mass of the head body but greater than about four grams that the large mass of the body and the small mass of the resiliently carried vibratory portion form a vibrating system having a resonance frequency which gives a good response in the speech frequency range, and accelerating the resiliently carried vibratory portion relative to the bone with electric oscillations of the principal speech frequency range so as to produce by the acceleration of the resiliently carried vibratory mass portion inertia reaction forces which impart to the bone the vibratory energy required for conducting corresponding vibrations of relatively large intensity and small amplitude through the bones to the inner ear and induce intelligible hearing of the speech.

24. The method of enabling a deafened person to hear speech through bone conduction by imparting audio-frequency vibrations to a bone of the massive head body surrounding his inner ears which resides in so resiliently carrying in a vibratory condition and in a stable-equilibrium coupling position on the bone a vibratory portion having a mass that is smaller than about sixty grams and only a small fraction of the mass of the head body but greater than about four grams that the large mass of the body and the small mass of the resiliently carried vibratory portion form a vibrating system having a resonance frequency which gives a good response in the speech frequency range, and accelerating the resiliently carried vibratory portion relative to the bone with electric oscillations of the principal speech frequency range so as to produce by the acceleration of the resiliently carried vibratory mass portion inertia reaction forces which impart to the bone the vibratory energy required for conducting corresponding vibrations of relatively large intensity and small amplitude through the bones to the inner ear and induce intelligible hearing of the speech.

25. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition, and a substantially rigid contact wall with lateral dimensions of the order of the lateral dimensions of the driving vibratory portion or greater, sufficiently large and so arranged opposite thereto as to maintain said vibratory unit in a stable-equilibrium coupling position on the bone under a relatively small external coupling force for coupling the small-mass of the driving vibratory portion with the large-mass body by the resilient junction into a vibratory system and for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the contact wall surface required for imparting to the driven vibratory portion and therethrough to the bone vibrations of large intensity and small amplitude required for inducing intelligible hearing of speech by bone conduction.

26. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition, and a substantially rigid contact wall with lateral dimensions of the order of the lateral dimensions of the driving vibratory portion or greater, sufficiently large and so arranged opposite thereto as to maintain said vibratory unit in a stable-equilibrium coupling position on the bone under a relatively small external coupling force for coupling the small-mass of the driving vibratory portion with the large-mass body by the resilient junction into a vibratory system and for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; said vibratory unit having a closure portion arranged to protectively isolate from the exterior the space across which said vibratory portions vibrate; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the contact wall surface required for imparting to the driven vibratory portion and therethrough to the bone vibrations of large intensity and small amplitude required for inducing intelligible hearing of speech by bone conduction.

27. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition, and a substantially rigid contact wall with lateral dimensions of the order of the lateral dimensions of the driving vibratory portion or greater, sufficiently large and so arranged opposite thereto as to maintain said vibratory unit in a stable-equilibrium coupling position on the bone under a relatively small external coupling force for coupling the small-mass of the driving vibratory portion with the large-mass body by the resilient junction into a vibratory system and for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces required for imparting to the driven vibratory portion and therethrough to the bone vibrations of large intensity and small amplitude required for inducing intelligible hearing of speech by bone conduction, and external supporting means having a universal joint connection with said vibratory unit for holding said contact coupled to the bone.

28. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about eighty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion sufficiently extended and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces required for imparting to the driven vibratory portion and therethrough to the bone vibrations of large intensity and small amplitude required for inducing intelligible hearing of speech by bone conduction.

29. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about fifty grams, so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion sufficiently extended and so arranged under and relatively to the driving vibratory portion as to maintain said vibratory unit in a stable-equilibrium coupling position on the bone under a relatively small external coupling force for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction.

30. In a wearable bone conduction hearing aid device, a vibratory structure designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about thirty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction.

31. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition, and a substantially rigid contact wall with lateral dimensions of the order of the lateral dimensions of the driving vibratory portion or greater, sufficiently large and so arranged opposite thereto as to maintain said vibratory unit in a stable-equilibrium coupling position on the bone under a relatively small external coupling force for coupling the small-mass of the driving vibratory portion with the large-mass body by the resilient junction into a vibratory system and for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the contact wall surface required for imparting to the driven vibratory portion and therethrough to the bone vibrations of large intensity and small amplitude required for inducing intelligible hearing of speech by bone conduction, and external supporting means having a pivotal joint connection with said vibratory unit for holding said contact wall coupled to the bone.

32. In a wearable bone conduction hearing aid device, a vibratory structure designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about four grams, and smaller than about one hundred and twenty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction, and external supporting means having a pivotal joint connection with said vibratory structure for holding said wall portion cooperatively coupled to the bone.

33. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about four grams, and smaller than about two hundred grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said vibratory unit having a substantially rigid wall portion sufficiently large and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction, and external supporting means having a universal joint connection with said vibratory unit for holding said wall portion cooperatively coupled to the bone.

34. In a wearable bone conduction hearing aid device, a vibratory unit designed and arranged to be sufficiently light and small for comfortable and substantially inconspicuous wear coupled to a hearing inducing bone outside the ear canal of the massive body of the head surrounding the inner ears of the user comprising: a driving vibratory portion having a mass greater than about three grams, which is only a small fraction of the mass of said body; a driven bone-coupling vibratory portion having a resilient junction carrying said driving portion in a vibratory condition, and a substantially rigid contact wall with lateral dimensions of the order of the lateral dimension of the driving vibratory portion or greater, sufficiently large and so arranged opposite thereto as to maintain said vibratory unit in a stable-equilibrium coupling position on the bone under a relatively small external coupling force for coupling the small-mass of the driving vibratory portion with the large-mass body by the resilient junction into a vibratory system and for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the contact wall surface required for imparting to the driven vibratory portion and therethrough to the bone vibrations of large intensity and small amplitude required for inducing intelligible hearing of speech by bone conduction, said contact wall being part of a casing enclosing said driving vibratory portion.

35. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about sixty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory member forming a part of a wall portion sufficiently extended and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts on the driven vibratory member and therethrough on the bone inertia reaction forces required for inducing intelligible hearing of speech by bone conduction.

36. In a wearable bone conduction hearing aid device a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about forty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory member forming a part of a wall portion sufficiently extended and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient juncting being so proportioned and so arranged in the vibratory unit that the vibratory system which they form with the large mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts inertia reaction forces required for imparting to the driven vibratory member and therethrough to the bone vibrations of large intensity and small amplitude required for inducing intelligible hearing of speech by bone conduction.

37. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about two hundred grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said vibratory unit having a substantially rigid wall portion sufficiently large and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts on the driven vibratory member and therethrough on the bone inertia reaction forces required for inducing intelligible hearing of speech by bone conduction, said wall portion forming a part of a casing enclosing said driving vibratory member.

38. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about two hundred grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said vibratory unit having a substantially rigid wall portion sufficiently large and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction, said wall portion forming a part of a casing enclosing said driving vibratory portion.

39. In a wearable bone conduction hearing aid device, a vibratory structure designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about one hundred and twenty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction, said wall portion forming a part of a casing enclosing said driving vibratory portion.

40. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about eighty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion sufficiently extended and so arranged under and relatively to the driving vibratory portion as to maintain said vibratory unit in a stable-equilibrium coupling position on the bone under a relatively small external coupling force for efficiently transmitting to the bone the vibratory forces exerted by the vibratory unit; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces required for imparting to the driven vibratory portion and therethrough to the bone vibrations of large intensity and small amplitude required for inducing intelligible hearing of speech by bone conduction, said wall portion forming a part of a casing enclosing said driving vibratory portion.

41. In a wearable bone conduction hearing aid device, a vibratory structure designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about eighty grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts on the driven vibratory portion and therethrough on the bone inertia reaction forces required for inducing intelligible hearing of speech by bone conduction, said wall portion forming a part of a casing enclosing said driving vibratory portion.

42. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about one hundred and twenty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory member forming a part of a wall portion sufficiently extended and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts inertia reaction forces required for imparting to the driven vibratory member and therethrough to the bone vibrations of large intensity and small amplitude required for inducing intelligible hearing of speech by bone conduction, said wall portion forming a part of a casing enclosing said driving vibratory member.

43. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about sixty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory member forming a part of a wall portion sufficiently extended and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts on the driven vibratory member and therethrough on the bone inertia reaction forces required for inducing intelligible hearing of speech by bone conduction, said wall portion forming a part of a casing enclosing said driving vibratory member.

44. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about two hundred grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said vibratory unit having a substantially rigid wall portion sufficiently large and so arranged under and relatively to the driving vibratory member as to maintain said vibratory unit in a stable-equilibrium coupling position on the bone under a relatively small external coupling force for efficiently transmitting to the bone the vibratory forces exerted by the vibratory unit; and means including windings on the driving core member for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts on the driven vibratory member and therethrough on the bone inertia reaction forces required for inducing intelligible hearing of speech by bone conduction.

45. In a wearable bone conduction hearing aid device, a vibratory unit designed and arranged to be sufficiently light and small for comfortable and substantially inconspicuous wear coupled to a hearing inducing bone of the massive body surrounding the inner ears of the user comprising: a driving vibratory magnetic core member having a mass greater than about four grams, and smaller than about one hundred and twenty grams so that it is only a small fraction of the mass of said body; a driven bone-coupling vibratory magnetic core member having a resilient junction carrying said driving core member in a vibratory condition to form therewith a magnetic path including a gap and arranged to operatively couple said small-mass driving member with the large-mass body by the resilient junction into a vibratory system; said driven vibratory portion forming part of a substantially rigid wall portion with lateral dimensions of the order of the lateral dimensions of the driving vibratory portion or greater, sufficiently large and so arranged opposite thereto as to maintain said vibratory unit in a stable-equilibrium coupling position on the bone under a relatively small external coupling force for efficiently transmitting to the bone the vibratory forces exerted by the vibratory unit; and means including windings on the driving core member for actuating said vibratory core members with electric oscillations throughout the principal speech frequency range for producing corresponding vibrations of said vibratory members across said gap; the mass of the driving vibratory member and the stiffness of its resilient junction being so proportioned and so arranged in the vibratory unit that the vibratory system which they form with the large mass of said body has a resonance frequency which gives a good vibratory response in the speech frequency range, and that the mass of the resiliently carried driving vibratory member is sufficiently large and subjected by the oscillations to sufficient acceleration relative to the bone so that the driving vibratory member exerts inertia reaction forces required for imparting to the driven vibratory member and therethrough to the bone vibrations of large intensity and small amplitude required for inducing intelligible hearing of speech by bone conduction.

46. In a wearable bone conduction hearing aid device, a vibratory structure designed and arranged to be sufficiently light and small for comfortable and substantially inconspicuous wear coupled to a hearing inducing bone of the massive body surrounding the inner ears of the user comprising: a driving vibratory portion having a mass greater than about four grams, and smaller than about one hundred grams so that it is only a small fraction of the mass of said body; a driven bone-coupling vibratory portion having a resilient junction carrying said driving portion in a vibratory condition and arranged to operatively couple said small-mass driving portion with the large-mass body by the resilient junction into a vibratory system; said driven vibratory portion forming a part of a wall portion with lateral dimensions of the order of the lateral dimensions of the driving vibratory portion or greater, sufficiently large and so arranged opposite thereto as to maintain said vibratory structure in a stable-equilibrium coupling position on the bone under a relatively small external coupling force for efficiently transmitting to the bone the vibratory forces exerted by the vibratory structure; and means for actuating said vibratory portions with electric oscillations throughout the principal speech frequency range for producing corresponding vibrations of said vibratory portions across the space between said vibratory portions; said vibratory structure having a closure portion arranged to protectively isolate from the exterior the space across which said vibratory portions vibrate; the mass of the driving vibratory portion and the stiffness of its resilient junction being so proportioned and so arranged in the vibratory structure that the vibratory system which they form with the large mass of said body has a resonance frequency which gives a good vibratory response in the speech frequency range, and that the mass of the resiliently carried driving vibratory portion is sufficiently large and subjected by the oscillations to sufficient acceleration relative to the bone so that the driving vibratory portion exerts inertia reaction forces in a general direction toward the contact wall surface required for imparting to the driven vibratory portion and therethrough to the bone vibrations of large intensity and small amplitude required for inducing intelligible hearing of speech by bone conduction.

47. In a bone conduction hearing aid device suitable for inconspicuous wear by a deafened person, a vibratory structure comprising a driven magnetic core portion having a contact surface arranged to be held coupled under pressure to hearing inducing bones of the user outside the ear canal, and a driving magnetic core portion resiliently carried by said driven core portion in a vibratory condition to form therewith a magnetic flux path including a gap, and means for actuating said vibratory structure with electric oscillations substantially throughout the speech frequency range to produce corresponding vibrations of said core portions across said gap, said vibratory structure and its several parts being so designed and proportioned that at an overall size of the vibratory structure having a volume of less than about three cubic inches, the driving vibrating core portion has a sufficiently large mass and exerts under the action of the electric oscillations sufficient inertia reaction forces upon said driven core portion and therethrough upon the coupled bones for imparting thereto the vibratory energy required for conducting corresponding vibrations through the bones to the inner ear and induce intelligible hearing.

48. In a bone conduction hearing device suitable for inconspicuous wear by the user, a vibratory structure having two resiliently joined vibratory portions, means for actuating said vibratory structure with electric oscillations of the principal audible frequency range for producing corresponding vibrations between said vibratory portions, and means for holding one of said vibratory portions coupled under pressure to hearing inducing bones of the user outside the ear canal and carrying the other vibratory portion of said vibratory structure in a freely vibrating condition, said resiliently carried vibratory portion having sufficient mass and exerting under the action of the electric oscillations sufficient inertia reaction for imparting to the coupled bones of the user the vibratory energy required for conducting corresponding vibrations through the bones to the inner ear of the user and induce intelligible hearing.

49. In a bone conduction hearing device suitable for inconspicuous wear by the user, a vibratory unit comprising a driven vibratory portion and a driving vibratory portion having a resilient junction portion resiliently carrying said driving vibratory portion relatively to said driven vibratory portion, means for actuating said vibratory portions with electric oscillations of the principal audible frequency range to produce corresponding vibrations of said vibratory portions, and means including a substantially rigid contact surface element arranged and shaped to protect said driving vibratory portion with its resilient junction portion against external forces and forming a part of said driven vibratory portion for holding said driven vibratory portion coupled under pressure to hearing inducing bones of the user outside the ear canal, said vibratory unit and its several parts being so designed and proportioned that, at an overall size of the unit having a volume of less than about two cubic inches, the driving vibratory portion has a sufficiently large mass of the order of eight grams or more and is subjected under the action of the electric oscillations to sufficient accelerations so that it exerts sufficient inertia reaction forces upon said contact surface element and therethrough upon the coupled bones of the user for imparting thereto the vibratory energy required for conducting corresponding vibrations through the bones to the inner ear of the user and induce intelligible hearing.

50. In a bone conduction hearing device suitable for inconspicuous wear by the user, a vibratory unit comprising a driven vibratory portion and a driving vibratory portion having a resilient junction portion vibratorily carrying said driving vibratory portion relatively to said driven vibratory portion, means for actuating said vibratory portions with electric oscillations of the principal audible frequency range to produce corresponding vibrations of said vibratory portions, and means including a substantially rigid casing enclosing said driving vibratory portion with its resilient junction portion and forming a part of said driven vibratory portion for holding said driven vibratory portion coupled under pressure to hearing inducing bones of the user outside the ear canal, said vibratory unit and its several parts being so designed and proportioned that, at an overall size of the unit having a volume of less than about three cubic inches, the driving vibratory portion has a sufficiently large mass greater than about four grams and is subjected under the action of the electric oscillations to sufficient accelerations so that it exerts sufficient inertia reaction forces upon said casing and therethrough upon the coupled bones of the user for imparting thereto the vibratory energy required for conducting corresponding vibrations through the bones to the inner ear of the user and induce intelligible hearing.

51. In an inconspicuous hearing imparting device, a vibratory structure comprising a rigid vibratory casing having an extended external vibration transmitting surface and a driven magnetic core portion operatively exposed to the interior of said casing, a driving magnetic core portion resiliently carried in a vibrating condition within said casing to form with said driven core portion a magnetic flux path including a gap, and means for actuating said vibratory structure with electric oscillations of the principal audible frequency range to produce corresponding vibrations of said core portions across said gap, said resiliently carried magnetic core portion having a mass sufficiently larger than the mass of said casing and exerting under the action of the electric oscillations sufficient inertia reaction forces upon said casing for imparting thereto vibratory energy required for transmitting from the external surface of said casing corresponding vibrations to the inner ear of the user and induce intelligible hearing.

52. In an inconspicuous hearing imparting device, a vibratory structure comprising a rigid vibratory casing having an extended external vibration transmitting surface, a vibratory portion resiliently carried within said casing, means for actuating said vibratory structure with electric oscillations of the principal audible frequency range for producing corresponding vibrations between said resiliently carried vibratory portion and said casing, said resiliently carried vibratory portion having sufficient mass larger than the mass of said casing and exerting under the action of the electric oscillations sufficient inertia reaction forces upon said casing for imparting thereto vibratory energy required for transmitting corresponding vibrations from the external surface of said casing to the inner ear of the user and induce intelligible hearing.

53. In a bone conduction hearing device suitable for inconspicuous wear by a user, a vibratory structure comprising an elastically deformable magnetic core member forming a magnetic flux path including a gap, said core member having a driven core portion with a contact surface arranged to be held coupled under pressure to hearing inducing bones of the user and a driving core portion resiliently carried in a vibrating condition relatively to said driven core portion, and windings interlinked with said flux path for actuating said vibratory structure with electric oscillations of the principal audible frequency range to produce corresponding vibrations of said core portions across said gap, said driving core portion having a sufficiently large mass and exerting under the action of the electric oscillations sufficient inertia reaction forces through said contact surface upon the coupled bones for imparting thereto the vibratory energy required for conducting corresponding vibrations through the bones to the inner ear and induce intelligible hearing.

54. In a bone conduction hearing aid device suitable for inconspicuous wear by a deafened person, a vibratory member comprising two resiliently joined magnetic core portions forming a magnetic flux path including a gap, one of said core portions having a rigid contact surface element arranged to be held coupled under pressure to hearing inducing bones of the user and resiliently carrying another of said core portions, and means for actuating said vibratory member with electric oscillations substantially throughout the speech frequency range to produce corresponding vibrations of said core portions across said gap, said resiliently carried core portion having a sufficiently large mass and exerting under the action of the electric oscillations sufficient inertia reaction forces upon said contact surface element and therethrough upon the coupled bones for imparting thereto the vibratory energy required for conducting corresponding vibrations through the bones to the inner ear and induce intelligible hearing, the stiffness of the resilient junction between said core portions being sufficiently large to secure a vibratory motion of said core portions at a gap spacing of less than four thousandths of an inch without fringing of said gap.

55. In a bone conduction hearing device suitable for inconspicuous wear by a user, a vibratory structure having a driving magnetic core member and a driven magnetic core member resiliently joined into a magnetic flux path including a gap, means for holding said driven core member coupled under pressure to hearing inducing bones of the user outside the ear canal and resiliently carrying said driving core member in a vibrating condition, and windings interlinked with said flux path for actuating said vibratory structure with electric oscillations of the principal audible frequency range to produce corresponding vibrations of said core members across said gap, said driving core member having a sufficient large mass and exerting under the action of the electric oscillations sufficient inertia reaction forces upon said driven core member and therethrough upon the coupled bones for imparting thereto the vibratory energy required for conducting corresponding vibrations through the bones to the inner ear and induce intelligible hearing, said driven core member being arranged and shaped to protect said driving core member against external forces.

56. In a bone conduction hearing device suitable for inconspicuous wear by a user, a vibratory structure having two resiliently joined core portions forming a magnetic flux path including two gaps, one of said core portions having two surfaces on opposite sides of said one core portion forming pole faces for said two gaps, the other core portion having two pole surfaces facing said pole faces on opposite sides of said two gaps, and windings interlinked with said flux path for actuating said core portions with electric oscillations substantially throughout the speech frequency range for producing corresponding vibrations of said core portions across said two gaps so as to increase one gap while the other gap is decreased, one of said core portions having a contact wall sufficiently large and so arranged opposite the other core portion as to maintain said vibratory structure in a stable-equilibrium coupling position on hearing inducing bone of the head under a relatively small external coupling force, and to resiliently carry said other core portion in a vibrating condition, the mass of the resiliently carried core portion being so proportioned and arranged that it forms with the large mass of said body a vibratory system having a resonance frequency which gives a good vibratory response in the speech frequency range, and that the mass of the resiliently carried core portion is sufficiently large and subjected by the oscillations to sufficient acceleration relative to the bones so that the resiliently carried core portion exerts inertia reaction forces required for imparting to the contact wall and therethrough to the bones vibrations of large intensity and small amplitude required for inducing intelligible hearing of speech by bone conduction.

57. In a bone conduction hearing device suitable for inconspicuous wear by a user, a vibratory structure having a driving magnetic core member and a driven magnetic core member resiliently joined to form a magnetic flux path including two gaps, said driven core member having a set of two surfaces on opposite sides of said driven core member forming pole faces for said two gaps, said driving core member including core portions extending toward the pole faces of said driven core member to form the opposite pole faces of said two gaps, and windings interlinked with said flux path for actuating said core members with electric oscillations of the principal audible frequency range for producing corresponding vibrations of said core members across said two gaps so as to inrcease one gap while the other gap is decreased, means including a rigid casing for holding said driven core member coupled under pressure to hearing inducing bones of the user outside the ear canal and resiliently carrying said driving core member in a vibrating condition within said casing, said driving core member having a sufficiently large mass and exerting under the action of the electric oscillations sufficient inertia reaction forces upon said driven core member and therethrough upon the coupled bones for imparting thereto the vibratory energy required for conducting corresponding vibrations through the bones to the inner ear and induce intelligible hearing.

58. In a bone conduction hearing device suitable for inconspicuous wear by a user, a vibratory structure having a driving magnetic core member and a driven magnetic core member resiliently joined to form a magnetic flux path including two gaps, said driven core member having a set of two surfaces on opposite sides of said driven core member forming pole faces for said two gaps, said driving core member including core portions extending toward the pole faces of said driven core member to form the opposite pole faces of said two gaps, and windings interlinked with said flux path for actuating said core members with electric oscillations of the principal audible frequency range for producing corresponding vibrations of said core members across said two gaps so as to increase one gap while the other gap is decreased, means including a casing for holding said driven core member coupled under pressure to hearing inducing bones of the user outside the ear canal and resiliently carrying said driving core member in a vibrating condition within said casing, said driving core member having a mass sufficiently larger than the mass of said driven core member and exerting under the action of the electric oscillations sufficient inertia reaction forces upon said driven core member and therethrough upon the coupled bones for imparting thereto the vibratory energy required for conducting corresponding vibrations through the bones to the inner ear and induce intelligible hearing, the stiffness of the resilient junction between said core members being sufficiently large to secure a vibratory motion of said core members at a gap spacing of less than four thousandths of an inch without fringing of said gap.

59. In a portable audiphone, the combination of electromagnetic means adapted to respond to varying currents substantially throughout the audible frequency range, a relatively stiff vibrating member carrying the means and forming a narrow gap between the member and the means of fixed dimension subject to the vibration imparted to the member by the means and which is less in amplitude than the width of the said air gap, and means for supporting the member in operative connection with the bone-structure of the user.

60. In a portable audiphone, the combination of a vibratory portion, an electromagnetic portion carried by said vibratory portion and including a speech coil and adapted when the coil is energized by varying currents to effect vibration of said vibratory portion, said electromagnetic portion having greater inertia than said vibratory portion, and means for holding the vibratory portion in operative connection with the bone structure of the user, whereby the vibrations of the vibratory portion are conducted through the bone structure to the inner ear of the user.

61. In a portable audiphone, the combination of a vibratory member, electromagnetic means carried by the member and adapted to respond to varying currents substantially throughout the audible frequency range for vibrating said member, and means for supporting the member in operative connection with the bone structure of the user, whereby the vibrations of said member are conducted through the bone structure to the inner ear of the user.

EMIL H. GREIBACH.